US010926606B2

(12) United States Patent
Lee et al.

(10) Patent No.: US 10,926,606 B2
(45) Date of Patent: Feb. 23, 2021

(54) HEAT PUMP SYSTEM FOR VEHICLE

(71) Applicant: Hanon Systems, Daejeon (KR)

(72) Inventors: Seung Ho Lee, Daejeon (KR); Jae Min Lee, Daejeon (KR); Seo Jun Yoon, Daejeon (KR)

(73) Assignee: Hanon Systems, Daejeon (KR)

( * ) Notice: Subject to any disclaimer, the term of this patent is extended or adjusted under 35 U.S.C. 154(b) by 70 days.

(21) Appl. No.: 16/328,819

(22) PCT Filed: Feb. 20, 2018

(86) PCT No.: PCT/KR2018/002038
§ 371 (c)(1),
(2) Date: Feb. 27, 2019

(87) PCT Pub. No.: WO2018/155871
PCT Pub. Date: Aug. 30, 2018

(65) Prior Publication Data
US 2019/0210427 A1     Jul. 11, 2019

(30) Foreign Application Priority Data

Feb. 21, 2017   (KR) ................. 10-2017-0022958
Feb. 28, 2017   (KR) ................. 10-2017-0025986

(51) Int. Cl.
*B60H 1/00*       (2006.01)
*F25B 49/02*      (2006.01)
(Continued)

(52) U.S. Cl.
CPC ..... *B60H 1/00907* (2013.01); *B60H 1/00271* (2013.01); *B60H 1/00885* (2013.01);
(Continued)

(58) Field of Classification Search
CPC ................................................. B60H 1/00907
(Continued)

(56) References Cited

U.S. PATENT DOCUMENTS

| 4,616,484 A * | 10/1986 | Mehdi ............... B60H 1/00007 62/180 |
| 8,336,319 B2 * | 12/2012 | Johnston ................. B60L 1/02 62/79 |
| 8,806,882 B2 * | 8/2014 | Bennion ................ F01P 7/165 62/323.1 |
| 2011/0296855 A1 * | 12/2011 | Johnston ................ B60L 58/27 62/79 |

(Continued)

FOREIGN PATENT DOCUMENTS

| KR | 10-2012-0103054 A | 9/2012 |
| KR | 10-1235039 B1 | 2/2013 |

(Continued)

*Primary Examiner* — Henry T Crenshaw
(74) *Attorney, Agent, or Firm* — Norton Rose Fulbright US LLP; James R. Crawford

(57) ABSTRACT

The present invention relates to a heat pump system for a vehicle, which can independently use waste heat of an engine just as a heat source by separating a heat generation part from a heat absorption part in the heat pump system using a water-cooled condenser, and reduce a length of a loop by separating a high temperature cooling water loop. The heat pump system for a vehicle includes: a first cooling water line for circulating cooling water by connecting a vehicle driving part and a chiller with each other; a second cooling water line disposed in an air-conditioning case for circulating cooling water by connecting a heater core used for heating the interior of the vehicle and a water-cooled condenser with each other; and a valve disposed between the first cooling water line and the second cooling water line. The first cooling water line and the second cooling water line are operated independently if the valve is arranged in a first manner, and the first cooling water line and the second cooling water line are in a serial connection if the valve is arranged in a second manner.

23 Claims, 13 Drawing Sheets

(51) Int. Cl.
*F25B 41/04* (2006.01)
*F25B 41/06* (2006.01)
*B60H 1/32* (2006.01)
*F25B 30/02* (2006.01)

(52) U.S. Cl.
CPC ..... *B60H 1/00914* (2013.01); *B60H 1/00921* (2013.01); *B60H 1/323* (2013.01); *B60H 1/3213* (2013.01); *B60H 1/32284* (2019.05); *F25B 30/02* (2013.01); *F25B 41/046* (2013.01); *F25B 41/06* (2013.01); *F25B 41/062* (2013.01); *F25B 49/02* (2013.01); *F25B 49/022* (2013.01); *F25B 49/027* (2013.01); *B60H 2001/00307* (2013.01); *B60H 2001/00928* (2013.01); *B60H 2001/00949* (2013.01); *F25B 2400/0401* (2013.01)

(58) Field of Classification Search
USPC ........................................................ 62/228.1
See application file for complete search history.

(56) References Cited

U.S. PATENT DOCUMENTS

| | | | | |
|---|---|---|---|---|
| 2012/0216983 | A1* | 8/2012 | Bennion | F01P 7/165 165/41 |
| 2016/0001635 | A1* | 1/2016 | Noda | B60H 1/00007 62/160 |
| 2017/0036513 | A1* | 2/2017 | Kodera | B60H 1/02 |
| 2018/0065444 | A1* | 3/2018 | Allgaeuer | B60H 1/00899 |
| 2018/0117984 | A1* | 5/2018 | Kim | B60H 1/00392 |
| 2018/0117986 | A1* | 5/2018 | Kim | B60H 1/00385 |
| 2019/0030991 | A1* | 1/2019 | Enomoto | B60H 1/00885 |

FOREIGN PATENT DOCUMENTS

| | | |
|---|---|---|
| KR | 10-1283592 B1 | 7/2013 |
| KR | 10-2014-0126846 A | 11/2014 |
| KR | 10-2016-0087001 A | 7/2016 |
| KR | 10-2016-0111577 A | 9/2016 |

* cited by examiner

HEAT PUMP SYSTEM FOR VEHICLE

This patent application is a national phase under 35 U.S.C. § 371 of International Application No. PCT/KR2018/002038 filed Feb. 20, 2018, which claims priority from Korean Patent Application No. 10-2017-0022958, filed Feb. 21, 2017, and from Korean Patent Application No. 10-2017-0025986, filed Feb. 28, 2017, each of which is hereby incorporated herein by reference in its entirety for all purposes.

TECHNICAL FIELD

The present invention relates to a heat pump system for a vehicle and, more particularly, to a heat pump system for a vehicle, which can selectively perform cooling and heating by changing a flow direction of refrigerant using one refrigerant cycle.

BACKGROUND ART

In general, an air conditioner for a vehicle includes a cooling system for cooling the interior of the vehicle, and a heating system for heating the interior of the vehicle. The cooling system converts the air, which passes the outside of an evaporator, into cold air by exchanging heat between the air and refrigerant, which flows inside the evaporator, from the evaporator side to cool the interior of the vehicle. The heating system converts the air, which passes the outside of a heater core of a cooling water cycle, into warm air by exchanging heat between the air and cooling water, which flows inside the heater core, from the heater core side to heat the interior of the vehicle.

In the meantime, differently from the air conditioner for the vehicle, a heat pump system which is capable of selectively carrying out cooling and heating by changing a flow direction of refrigerant using one refrigerant cycle is disclosed. The heat pump system includes, for instance, two heat exchangers, namely, an indoor heat exchanger mounted inside an air-conditioning case to exchange heat with air blown to the interior of the vehicle and an outdoor heat exchanger mounted outside the air-conditioning case to exchange heat, and a direction-changing valve for changing a flow direction of refrigerant. Therefore, the indoor heat exchanger serves as a heat exchanger for cooling when the heat pump system is operated in a cooling mode according to the flow direction of refrigerant by the direction-changing valve and also serves as a heat exchanger for heating when the heat pump system is operated in a heating mode.

Meanwhile, a hybrid vehicle operated by an engine (internal combustion engine) and an electric motor uses waste heat (cooling water) of the engine as a heating heat source for interior heating. That is, the hybrid vehicle can use an air conditioner in the same way as the conventional vehicle, but uses residual heat of cooling water of the engine as a heating heat source even though the engine is turned off when being operated by the electric motor. In the case that the vehicle is operated by the electric motor, if outdoor temperature is low, namely, below about zero degree, the hybrid vehicle is deteriorated in fuel efficiency since forcibly operating the engine in order to secure the heating heat source even though it can be operated by the electric motor.

Korean Patent Publication No. 10-2014-0126846 (published on Nov. 3, 2014) discloses a heat pump system for a vehicle for cooling and heating using an evaporator in an air-conditioning case commonly in an air conditioner mode and in a heat pump mode. FIG. 1 illustrates an air conditioner mode of a conventional heat pump system for a vehicle, and FIG. 2 illustrates a heat pump mode of the conventional heat pump system.

As illustrated in FIGS. 1 and 2, the conventional heat pump system for a vehicle is preferably applied to a hybrid vehicle, and includes a compressor 100, an evaporator 110, an outdoor heat exchanger 130, an expansion means 120, a chiller 140, a first refrigerant circulation line R1, and a second refrigerant circulation line R2.

In the air conditioner mode, the first refrigerant circulation line R1 is formed in such a way that refrigerant discharged from the compressor 100 circulates through the outdoor heat exchanger 130, the expansion means 120, the evaporator 110, and the compressor 100. In the heat pump mode, the second refrigerant circulation line R2 is formed in such a way that the refrigerant discharged from the compressor 100 circulates through the evaporator 110, the expansion means 120, the chiller 140, and the compressor 100.

The first refrigerant circulation line R1 and the second refrigerant circulation line R2 are formed to use a partial section commonly. That is, a partial section of the first refrigerant circulation line R1 and a partial section of the second refrigerant circulation line R2 are integrated and used commonly. Common sections a and b of the first and second refrigerant circulation lines R1 and R2 are a section a to which the compressor 100 is connected, and a section b to which the evaporator 110 and the expansion means 120 are connected. The outdoor heat exchanger 130 is disposed in the first refrigerant circulation line R1, and the chiller 140 is disposed in the second refrigerant circulation line R2.

The compressor 100 inhales and compresses the refrigerant, and then, discharges the compressed refrigerant in a gaseous state of high temperature and high pressure. The evaporator 110 is mounted inside an air-conditioning case 150 and exchanges heat between the refrigerant and air flowing in the air-conditioning case 150. The evaporator 110 serves as an evaporator 110 to cool in the air conditioner mode, and serves as a condenser to heat in the heat pump mode.

The outdoor heat exchanger 130 is mounted outside the air-conditioning case 150 to exchange heat between outdoor air and the refrigerant. The expansion means 120 is arranged between the evaporator 110 and the outdoor heat exchanger 130 to expand the refrigerant. A heater core 160 connected with a vehicle engine 161 through a cooling water circulation line W is disposed inside the air-conditioning case 150. A water pump 162 for circulating cooling water of the engine 161 toward the heater core 160 is disposed in the cooling water circulation line W.

A temperature adjusting door 151 for adjusting an amount of air bypassing the heater core 160 and an amount of air passing the heater core 160 is disposed between the evaporator 110 and the heater core 160. An on-off valve 182 which is closed in the air conditioner mode and is opened in the heat pump mode is disposed in the second refrigerant circulation line R2 located at an inlet side of the chiller 140. An accumulator 170 for dividing the refrigerant introduced into the compressor 100 into liquid-phase refrigerant and gas-phase refrigerant and supplying only the gas-phase refrigerant is disposed at an inlet side of the compressor 100.

A first direction changing valve 181 for changing a flow direction of the refrigerant discharged from the compressor 100 so that the refrigerant flows toward the first refrigerant circulation line R1 or the second refrigerant circulation line R2 according to the air conditioner mode or the heat pump mode is disposed at a point where the first and second refrigerant circulation lines R1 and R2 diverge from an outlet side of the compressor 100.

Moreover, a second direction changing valve 182 of a three-way valve structure for changing a flow direction of the refrigerant so that the refrigerant, which is discharged from the evaporator 110, flows toward the compressor 100 along the first refrigerant circulation line R1 in the air conditioner mode and the refrigerant, which is discharged from the compressor 100 and flows in the second refrigerant circulation line R2, flows toward the evaporator 110 in the heat pump mode is disposed at a point where the first and second circulation lines R1 and R2 diverge from one side of the evaporator 110, which connects the section a to which the compressor 100 is connected and the section b to which the evaporator 110 and the expansion means 120 are connected.

Referring to FIG. 1, in an off state of the engine, in the air conditioner mode, the refrigerant circulates along the first refrigerant circulation line R1 by control of the first direction changing valve 181, the second direction changing valve 182 and the on-off valve 183. In the off state of the engine, the water pump 162 stops so that cooling water does not circulate toward the heater core 160 and the chiller 140. In the maximum cooling mode, the temperature adjusting door 151 in the air-conditioning case 150 is operated to close a passageway passing the heater core 160, so that air blown into the air-conditioning case 150 by a blower is cooled while passing through the evaporator 110, and then, bypasses the heater core 160 and is supplied to the interior of the vehicle to cool the interior of the vehicle.

The gas-phase refrigerant of high temperature and high pressure discharged after being compressed in the compressor 100 is supplied to the outdoor heat exchanger 130 through the first direction changing valve 181. The refrigerant supplied to the outdoor heat exchanger 130 is condensed by exchanging heat with outdoor air, so the gas-phase refrigerant is converted into liquid-phase refrigerant. Continuously, the refrigerant passing through the outdoor heat exchanger 130 is decompressed and expanded while passing through the expansion means 120 to become a liquid-phase refrigerant of low temperature and low pressure, and then, is introduced into the evaporator 110. The refrigerant introduced into the evaporator 110 is evaporated by exchanging heat with the air blown into the air-conditioning case 150 by the blower, and at the same time, cools the air through a heat absorption by an evaporative latent heat of the refrigerant, and then, the cooled air is supplied to the interior of the vehicle to cool the interior. After that, the refrigerant discharged from the evaporator 110 is introduced into the compressor 100 through the second direction-changing valve 182, and repeats the above cycle.

Referring to FIG. 2, in the heat pump mode in the off state of the engine, the refrigerant circulates along the second refrigerant circulation line R2 by control of the first direction changing valve 181, the second direction changing valve 182 and the on-off valve 183. In the off state of the engine, cooling water does not circulate toward the heater core 160 and the chiller 140, but may circulate to the heater core 160 and the chiller 140 if the water pump 162 is operated. Furthermore, in the off state of the engine 161, residual heat of the cooling water of the engine 161 is used as the heating heat source. In the maximum heating mode, the temperature adjusting door 151 in the air-conditioning case 150 is operated to close a passageway bypassing the heater core 160, so that the air blown into the air-conditioning case 150 is converted into warm air while passing through the evaporator 110, which serves for heating, and then, is supplied to the interior of the vehicle to heat the interior of the vehicle.

The gas-phase refrigerant of high temperature and high pressure discharged after being compressed in the compressor 100 is supplied to the evaporator 110 through the first direction changing valve 181 and the second direction changing valve 182. The gas-phase refrigerant of high temperature and high pressure supplied to the evaporator 110 is condensed by exchanging heat with the air flowing in the air-conditioning case 150, and at the same time, heats the air. As described above, the heated air is supplied to the interior of the vehicle to heat the interior of the vehicle. Continuously, the refrigerant passing through the evaporator 110 is decompressed and expanded while passing through the expansion means 120 to become a liquid-phase refrigerant of low temperature and low pressure, and then, is introduced into the chiller 140. The refrigerant introduced into the chiller 140 is evaporated by exchanging heat with cooling water (engine waste heat) of the engine 161. After that, the refrigerant discharged from the evaporator 110 is introduced into the compressor 100 through the second direction-changing valve 182, and repeats the above cycle.

The conventional heat pump system for a vehicle provides interior heating effect by recovering cooling water heat source of the engine and uses as heat for heating by radiating refrigerant heat from the evaporator. Additionally, the conventional heat pump system recovers waste heat of the engine through the chiller to use as refrigerant evaporation energy. In the meantime, the heater core which is a heat generation part and the chiller which is a heat absorption part are formed in one loop.

In case of the conventional heat pump system for a vehicle, if the heat pump is operated, temperature of the cooling water is rapidly changed, and warm air passing through the evaporator heats the cooling water flowing in the heater core according to the temperature of the cooling water. Moreover, the conventional heat pump system for a vehicle has another disadvantage in that it requires additional management in manufacturing and increases manufacturing expenses since requiring additional evaporator for high pressure.

Furthermore, the conventional heat pump system for a vehicle has several disadvantages in that there are lots of energy losses due to a heat loss from a cooling water hose since the loop of the high temperature cooling water line is long, and in that it is difficult to secure sufficient flow rate and it causes deterioration in heating performance since pressure head increases.

Additionally, the conventional heat pump system for a vehicle has another disadvantage in that it cannot perform dehumidification in a heating cycle of about 0° C. to 10° C. That is, air-conditioning power consumption increases since it must perform heating using a high voltage PTC heater while operating the cooling cycle.

DISCLOSURE

Technical Problem

Accordingly, the present invention has been made in view of the above-mentioned problems occurring in the prior art, and it is an object of the present invention to provide a heat pump system for a vehicle, which can independently use waste heat of an engine just as a heat source by separating a heat generation part from a heat absorption part in the heat pump system using a water-cooled condenser, and reduce a length of a loop by separating a high temperature cooling water loop.

It is another object of the present invention to provide a heat pump system for a vehicle, which heats cooling water through refrigerant heat using a water-heated condenser, and at the same time, makes refrigerant of low temperature and low pressure flow toward an indoor heat exchanger in order to perform dehumidification.

Technical Solution

To accomplish the above object, according to the present invention, there is provided a heat pump system for a vehicle including: a compressor for compressing and discharging refrigerant; an evaporator disposed inside an air-conditioning case to exchange heat between air and the refrigerant; an outdoor heat exchanger mounted outside the air-conditioning case to exchange heat between outdoor air and the refrigerant; a heater core disposed inside the air-conditioning case to exchange heat between the air and cooling water; a first expansion means disposed between the evaporator and the outdoor heat exchanger to expand the refrigerant; a chiller for exchanging heat between waste heat of the vehicle and the refrigerant; a first cooling water line which is a passageway for circulating cooling water by connecting an engine of the vehicle with the chiller; a second cooling water line connected to the first cooling water line to selectively pass or bypass the first cooling water line, and circulating the heater core; a water-cooled condenser disposed in the second cooling water line of an upstream side of the heater core in a flow direction of the cooling water, and exchanging heat between the refrigerant discharged from the compressor and the cooling water flowing in the second cooling water line; a first refrigerant line, which connects the refrigerant line in such a way that the refrigerant discharged from the compressor circulates through the outdoor heat exchanger, the first expansion means, the evaporator, and the compressor in a cooling mode; and a second refrigerant circulation line, which connects the refrigerant line in such a way that the refrigerant discharged from the compressor circulates through the water-cooled condenser, the chiller, and the compressor in a heat pump mode for heating.

Moreover, a four-way valve is disposed to connect the first cooling water line and the second cooling water line with each other, and the cooling water passing through the heater core passes or bypasses the chiller and the engine according to operation of the four-way valve.

Furthermore, in the second refrigerant circulation line, a second expansion means is disposed between the water-cooled condenser and the chiller.

Additionally, in the cooling water mode for heating, the compressor is stopped, and the second cooling water line is connected to the first cooling water line so that the cooling water circulates through the water-cooled condenser, the heater core, the chiller, the engine, and the water-cooled condenser.

In addition, in the heat pump mode for heating, the refrigerant discharged from the compressor circulates through the water-cooled condenser, the chiller, and the compressor, and the second cooling water line bypasses the first cooling water line so that the cooling water circulates through the water-cooled condenser, the heater core, and the water-cooled condenser, and wherein the cooling water of the first cooling water line independently circulates through the engine, the chiller, and the engine with respect to the second cooling water line.

Moreover, the heat pump system further includes a cooling water temperature sensor for sensing temperature of the cooling water, wherein the heat pump mode for heating is performed if the sensed temperature of the cooling water is lower than reference temperature, and the cooling water mode for heating is performed if the sensed temperature of the cooling water is higher than the reference temperature.

Furthermore, a heating means is disposed in the second cooling water line to heat the cooling water.

Additionally, a first water pump for circulating the cooling water is disposed in the first cooling water line, and a second water pump for circulating the cooling water is disposed in the second cooling water line.

In addition, a first direction changing valve is disposed at a point where the first and second refrigerant circulation lines diverge from an outlet side of the compressor. The first direction changing valve changes the flow direction of the refrigerant so that the refrigerant discharged from the compressor flows toward the first refrigerant circulation line or the second refrigerant circulation line according to the cooling mode or the heating mode.

Moreover, a third cooling water line branches off from the second cooling water line at the upstream side of the water-cooled condenser and is connected to the second cooling water line at the downstream side of the heater core.

Furthermore, the heat pump system further includes: a second direction changing valve disposed at a connection point between the second cooling water line and the third cooling water line at the upstream side of the water-cooled condenser; and a third direction changing valve disposed at a connection point between the second cooling water line and the third cooling water line at the downstream side of the heater core.

Additionally, if temperature of the cooling water is lower than the reference temperature, the cooling water passing through the heater core passes through the third cooling water line by the third direction changing valve, and circulates through the water-cooled condenser and the heater core by the second direction changing valve.

In addition, if temperature of the cooling water is higher than the reference temperature, the cooling water passing through the engine passes through the water-cooled condenser and the heater core after bypassing the third cooling water line by the second direction changing valve, and then, circulates through the chiller and the engine by the third direction changing valve.

Moreover, the heat pump system further includes: a compressor for compressing and discharging refrigerant; an indoor heat exchanger disposed in the air-conditioning case to exchange heat between air and the refrigerant; an outdoor heat exchanger mounted outside the air-conditioning case to exchange heat between outdoor air and the refrigerant; a first expansion means disposed between the indoor heat exchanger and the outdoor heat exchanger to expand the refrigerant; a first refrigerant circulation line, which connects a refrigerant line so that the refrigerant discharged from the compressor circulates through the outdoor heat exchanger, the first expansion means, the indoor heat exchanger, and the compressor; and a second refrigerant circulation line, which connects the refrigerant line so that the refrigerant discharged from the compressor circulates through the water-cooled condenser, the chiller, and the compressor, wherein some of the refrigerant of the second refrigerant circulation line branches off to the first refrigerant circulation line.

Furthermore, the heat pump system further includes: a second expansion means disposed in the second refrigerant circulation line between the water-cooled condenser and the chiller to expand the refrigerant; and a refrigerant branching line branching off from the second refrigerant circulation line at the downstream side of the second expansion means, and making at least some of the refrigerant flowing toward the chiller selectively flow toward the indoor heat exchanger.

Additionally, the refrigerant branching line connects the refrigerant line between the second expansion means and the compressor to the front end of the indoor heat exchanger.

Moreover, the refrigerant branching line branches off between the second expansion means and the chiller, and is connected to the first refrigerant circulation line between the first expansion means and the indoor heat exchanger.

Furthermore, the refrigerant branching line is connected in an upward direction from the second refrigerant circulation line.

Additionally, in a dehumidification mode, some of the refrigerant, which is discharged from the compressor and flows to the chiller after passing through the water-cooled condenser and the second expansion means, selectively flows to the refrigerant branching line and passes through the indoor heat exchanger.

Advantageous Effects

As described above, the heat pump system for a vehicle according to an embodiment of the present invention can be used to an electric vehicle and an internal combustion engine vehicle in common, and can independently use the waste heat of the engine just as a heat source by separating the heater core which is the heat generation part from the chiller which is the heat absorption part, and control the cooling water stably.

Moreover, the heat pump system for a vehicle can reduce energy losses and increase the quantity of cooling water flowing by the same power, thereby increasing heating performance.

Furthermore, the heat pump system for a vehicle according to the present invention can reduce air-conditioning power consumption since the refrigerant of a low pressure part is divided toward the chiller and the indoor heat exchanger without operation of a high voltage PTC and the compressor even during the heating mode. Additionally, the heat pump system for a vehicle according to the present invention can prevent oil circulating in the refrigerant line from being gathered in the branching line since the refrigerant branching line branches off above the second refrigerant circulation line, which is the heating line so that a refrigerant branching direction is always formed at an upper part.

MODE FOR INVENTION

Reference will be now made in detail to a preferred embodiment of the present invention with reference to the attached drawings.

Figure 1:
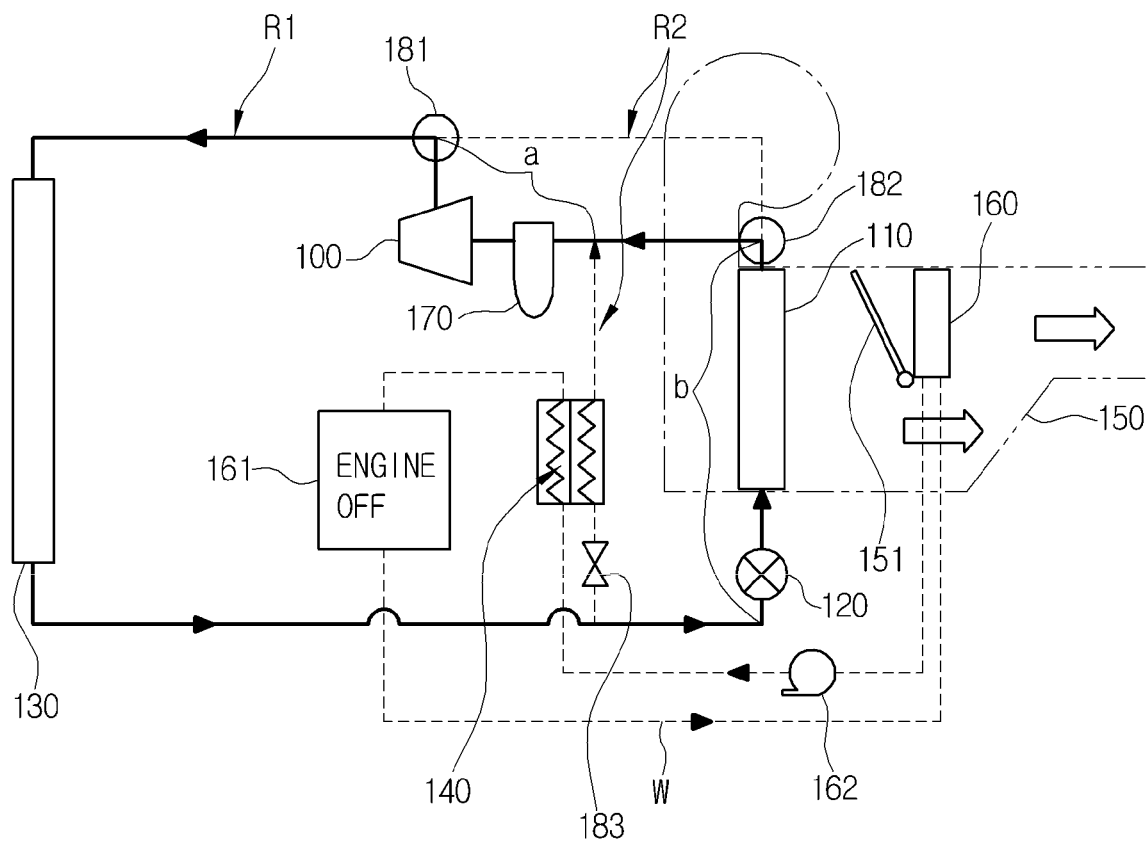
FIG. 1 is a view showing an air conditioner mode of a conventional heat pump system for a vehicle.
Figure 2:
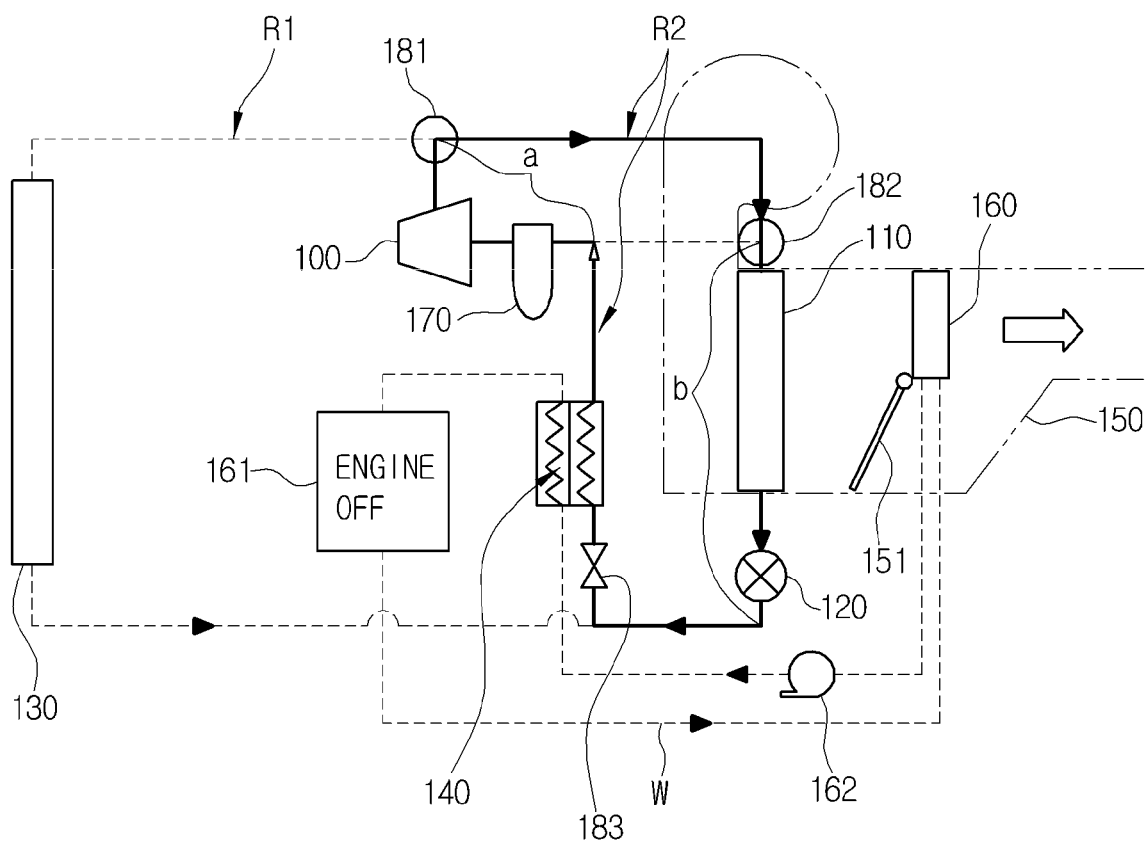
FIG. 2 is a view showing a heat pump mode of the conventional heat pump system for a vehicle.
Figure 3:
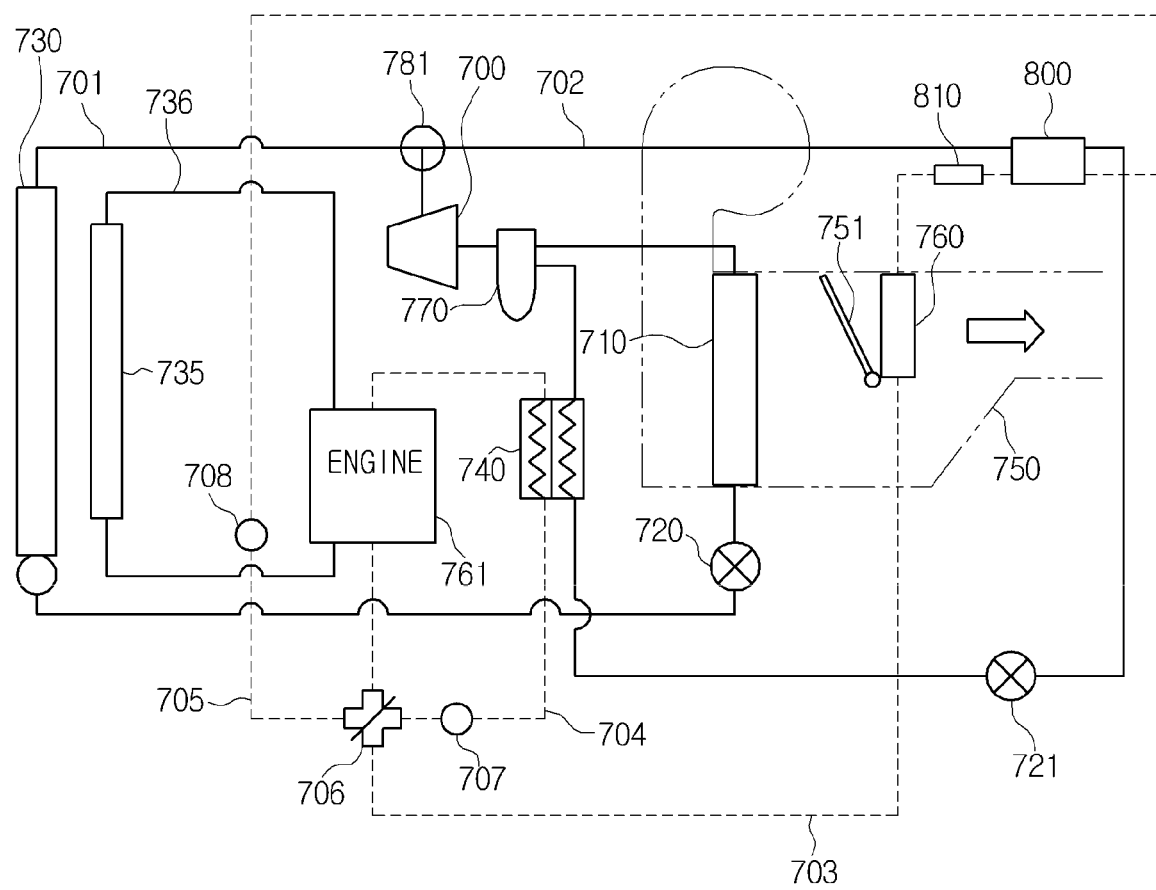
FIG. 3 is a view showing a heat pump system for a vehicle according to a first preferred embodiment of the present invention.

FIG. 3 is a view showing a heat pump system for a vehicle according to a first preferred embodiment of the present invention.

The heat pump system for a vehicle according to the first preferred embodiment of the present invention includes: a first cooling water line 704 for circulating cooling water by connecting a vehicle driving part and a chiller 740 with each other; a second cooling water line disposed in an air-conditioning case 750 for circulating cooling water by connecting a heater core 760 used for heating the interior of the vehicle and a water-cooled condenser 800 with each other; and a valve disposed between the first cooling water line 704 and the second cooling water line.

The first cooling water line 704 and the second cooling water line are operated independently if the valve is arranged in a first manner, but are in a serial connection if the valve is arranged in a second manner. Moreover, the heat pump system for a vehicle has a refrigerant line including a compressor 700, an outdoor heat exchanger 730, a first expansion means 720 and an evaporator 710 in order to air-condition the interior of the vehicle. A chiller 740 of the first cooling water line 704 and a water-cooled condenser 800 of the second cooling water line exchange heat with the refrigerant line. In this instance, the chiller 740 exchanges heat with refrigerant before introduction, and the water-cooled condenser 800 exchanges heat with refrigerant discharged from the compressor 700.

In more detail, as shown in FIG. 3, the heat pump system for a vehicle according to the first preferred embodiment of the present invention is applied to a hybrid vehicle, and includes a compressor 700, an evaporator 710, an outdoor heat exchanger 730, a heater core 760, a first expansion means 720, a chiller 740, a first cooling water line 704, a second cooling water line, a water-cooled condenser 800, a first refrigerant line 701, and a second refrigerant line 702.

The compressor 700 inhales and compresses refrigerant, and then, discharges the compressed refrigerant in a gaseous state of high temperature and high pressure. The evaporator 701 is disposed inside the air-conditioning case 750 to exchange heat between the refrigerant and air flowing inside the air-conditioning case 750. The outdoor heat exchanger 730 is disposed outside the air-conditioning case 750 to exchange heat between outdoor air and the refrigerant. The heater core 760 is disposed inside the air-conditioning case 750 to exchange heat between cooling water and the air flowing inside the air-conditioning case 750. The first expansion means 720 is arranged between the evaporator 710 and the outdoor heat exchanger 730 to expand the refrigerant.

Between the evaporator 710 and the heater core 760 inside the air-conditioning case 750, a temperature adjusting door 751 is disposed to adjust an amount of air bypassing the heater core and an amount of air passing the heater core 760. The chiller 740 exchanges heat between waste heat of the vehicle and the refrigerant. An accumulator 770 for dividing the refrigerant introduced into the compressor 700 into liquid-phase refrigerant and gas-phase refrigerant and supplying only the gas-phase refrigerant is disposed at an inlet side of the compressor 700.

The first cooling water line 704 is a passageway for circulating cooling water by connecting an engine 761 of the vehicle and the chiller 740 with each other.

For convenience in description, the second cooling water line has reference numerals 703 and 705, but is a single line. Namely, the second cooling water line is divided into an upstream side line 703 and a downstream side line 705 of a four-way valve 706. The second cooling water line 703 and 705 is connected to the first cooling water line 704, selectively passes or bypasses the first cooling water line 704, and circulates through the heater core 760.

The water-cooled condenser 800 is disposed in the second cooling water line of an upstream side of the heater core 760 in a flow direction of the cooling water. The water-cooled condenser 800 exchanges heat between the refrigerant discharged from the compressor 700 and the cooling water flowing in the second cooling water line.

In the cooling mode, the first refrigerant line 701 connects the refrigerant line in such a way that the refrigerant discharged from the compressor 700 circulates through the outdoor heat exchanger 730, the first expansion means 720, the evaporator 710, and the compressor 700. In the heat pump mode for heating, the second refrigerant circulation line 702 connects the refrigerant line in such a way that the refrigerant discharged from the compressor 700 circulates through the water-cooled condenser 800, the chiller 740, and the compressor 700.

A first direction changing valve 781 is disposed at a point where the first and second refrigerant circulation lines 701 and 702 diverge from an outlet side of the compressor 700. The first direction changing valve 781 changes the flow direction of the refrigerant so that the refrigerant discharged from the compressor 700 flows toward the first refrigerant circulation line 701 or the second refrigerant circulation line 702 according to the cooling mode or the heating mode. The first direction changing valve 781 is preferably a three-way valve.

A four-way valve 706 is disposed at a connection point between the first cooling water line 704 and the second cooling water line 703 and 705. The four-way valve 706 connects the first cooling water line 704 and the second cooling water line 703 and 705 with each other, and the cooling water passing through the heater core 760 passes or bypasses the chiller 740 and the engine 761 according to operation of the four-way valve 706. It is preferable that a second outdoor heat exchanger 735 be connected to the engine 761 through another cooling water line 736.

Moreover, in the second refrigerant circulation line 702, a second expansion means 721 is disposed between the water-cooled condenser 800 and the chiller 740. In this instance, preferably, the first expansion means 720 is an expansion valve operated mechanically or electronically, and the second expansion means 721 is a one-way orifice.

Furthermore, a heating means 810 for heating the cooling water is disposed in the second cooling water line 703 and 705. The heating means 810 may be a PTC heater, and is preferably disposed between the water-cooled condenser 800 and the heater core 760. Additionally, a first water pump 707 for circulating the cooling water is disposed in the first cooling water line 704, and a second water pump 708 for circulating the cooling water is disposed in the second cooling water line.

In the cooling water mode for heating, the compressor 700 is stopped, and the second cooling water line is connected to the first cooling water line 704 so that the cooling water circulates through the water-cooled condenser 800, the heater core 760, the chiller 740, the engine 761, and the water-cooled condenser 800.

In the heat pump mode for heating, the refrigerant discharged from the compressor 700 circulates through the water-cooled condenser 800, the chiller 740, and the compressor 700, and the second cooling water line bypasses the first cooling water line 704 so that the cooling water circulates through the water-cooled condenser 800, the heater core 760, and the water-cooled condenser 800. The cooling water of the first cooling water line 704 independently circulates through the engine 761, the chiller 740, and the engine 761 with respect to the second cooling water line.

In the meantime, the heat pump system for a vehicle includes a cooling water temperature sensor for sensing temperature of the cooling water. A control unit of the heat pump system for a vehicle performs the heat pump mode if the sensed temperature of the cooling water is lower than reference temperature, and performs the cooling water mode if the sensed temperature of the cooling water is higher than the reference temperature.

Figure 4:
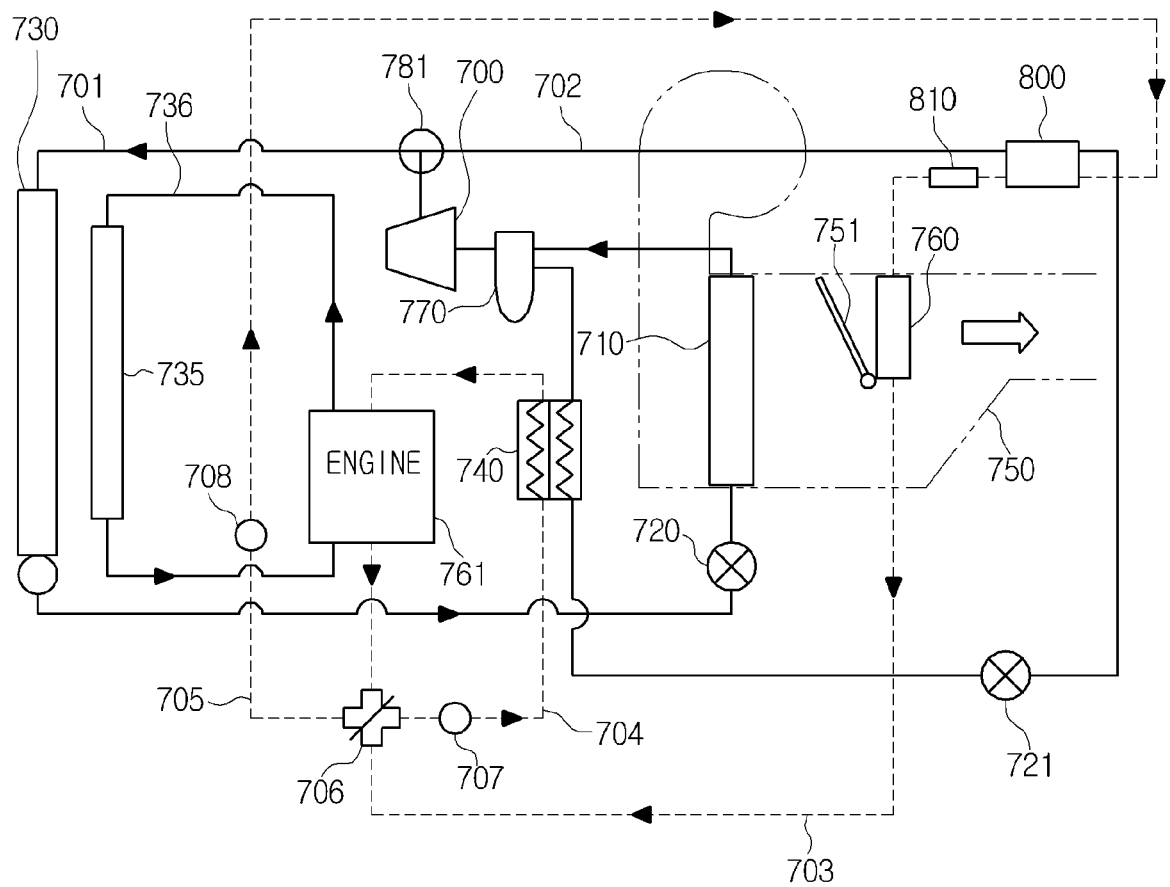
FIG. 4 is a view showing a cooling mode of the heat pump system for a vehicle according to the first preferred embodiment of the present invention.

FIG. 4 is a view showing a cooling mode of the heat pump system for a vehicle according to the first preferred embodiment of the present invention.

Referring to FIG. 4, in the cooling mode, the refrigerant circulates along the first refrigerant circulation line 701 by control of the first direction changing valve 781. In the maximum cooling mode, the temperature adjusting door 751 in the air-conditioning case 750 is operated to close the passageway passing through the heater core 760, so that the air blown into the air-conditioning case 750 by the blower is cooled after passing through the evaporator 710, bypasses the heater core 760, and then, is supplied to the interior of the vehicle to cool the interior of the vehicle.

The gas-phase refrigerant of high temperature and high pressure discharged after being compressed in the compressor 700 is supplied to the outdoor heat exchanger 730 through the first direction changing valve 781. The refrigerant supplied to the outdoor heat exchanger 730 is condensed by exchanging heat with the outdoor air, and the gas-phase refrigerant is changed into liquid-phase refrigerant. Continuously, the refrigerant passing through the outdoor heat exchanger 730 is decompressed and expanded while passing through the first expansion means 720 to become liquid-phase refrigerant of low temperature and low pressure, and then, is introduced into the evaporator 710.

The refrigerant introduced into the evaporator 710 is evaporated by exchanging heat with the air blown into the air-conditioning case 750 by the blower, and at the same time, cools the air through a heat absorption by an evaporative latent heat of the refrigerant, and then, the cooled air is supplied to the interior of the vehicle to cool the interior. After that, the refrigerant discharged from the evaporator 710 is introduced into the compressor 700 through the accumulator 770, and repeats the above cycle.

In this instance, the cooling water passing through the engine 761 passes through the water-cooled condenser 800, the heating means 810, and the heater core 760, and then, circulates through the engine 761 after passing through the chiller 740 by the four-way valve 706.

Figure 5:
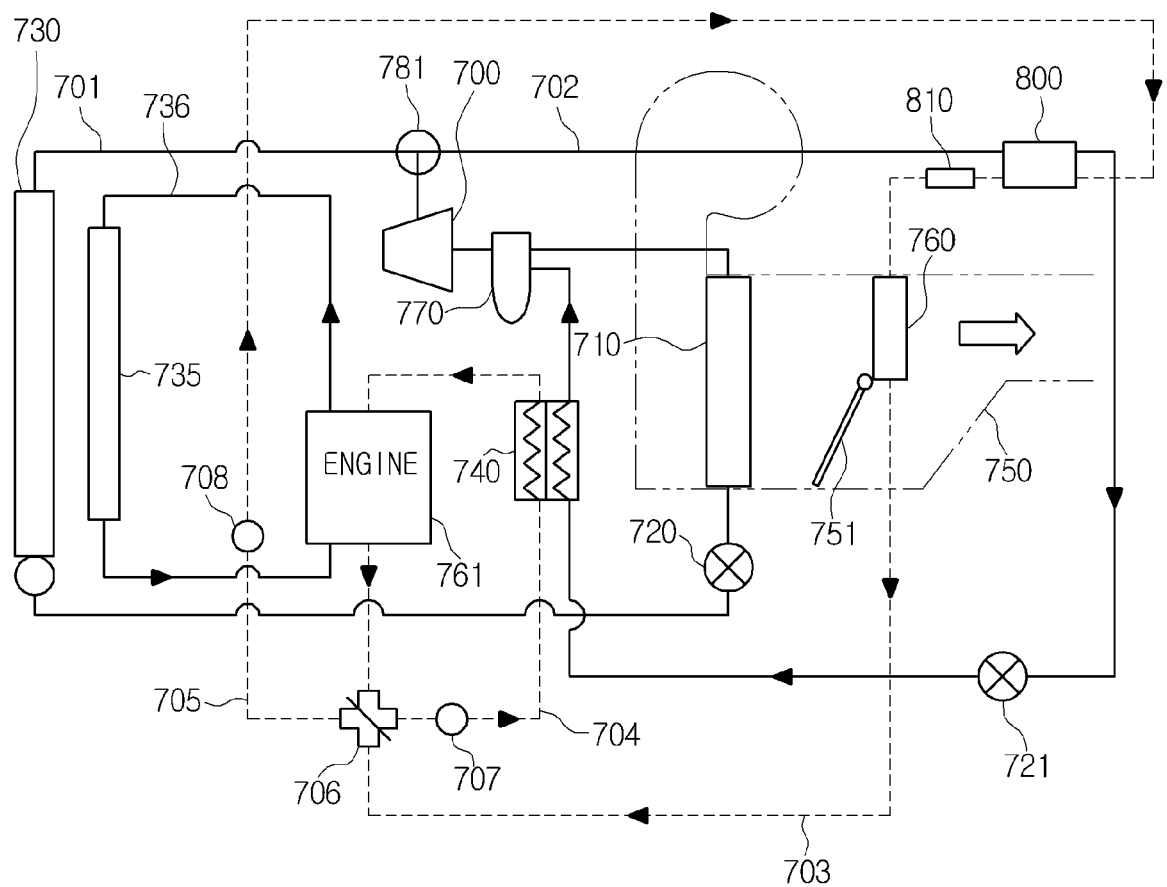
FIG. 5 is a view showing a heat pump mode of the heat pump system for a vehicle according to the first preferred embodiment of the present invention.

FIG. 5 is a view showing the heat pump mode of the heat pump system for a vehicle according to the first preferred embodiment of the present invention.

Referring to FIG. 5, when the heat pump mode for heating is performed due to a relatively low temperature of the cooling water, the refrigerant is circulated along the second refrigerant circulation line 702 by control of the first direction changing valve 781. In the maximum heating mode, the temperature adjusting door 751 in the air-conditioning case 750 is operated to close the passageway bypassing the heater core 760, so that the air blown into the air-conditioning case 750 by the blower is changed into warm air while passing the heater core 760, and then, is supplied to the interior of the vehicle to heat the interior of the vehicle.

The gas-phase refrigerant of high temperature and high pressure discharged after being compressed in the compressor 700 heats the cooling water passing through the water-cooled condenser 800 while passing through the water-cooled condenser 800 through the first direction changing valve 781. The refrigerant condensed in the water-cooled condenser 800 is expanded while passing through the second expansion means 721, recovers waste heat of the engine while passing the chiller 740, and then, is circulated to the compressor 700.

In this instance, the cooling water heated in the water-cooled condenser 800 performs indoor heating by exchanging heat with the air after passing through the heater core 760. That is, the cooling water passing through the water-cooled condenser 800 bypasses the chiller 740 and the engine 761 by the four-way valve 706 after passing through the heater core 760 along the second cooling water line 703 and 705, and then, is circulated to the water-cooled condenser 800. In the meantime, the cooling water flowing in the first cooling water line 704 circulates through the engine 761, the chiller 740, and the engine 761. The heater core 760 of the second cooling water line acts as a heat generation part, and the chiller 740 of the first cooling water line acts as a heat absorption part.

Figure 6:
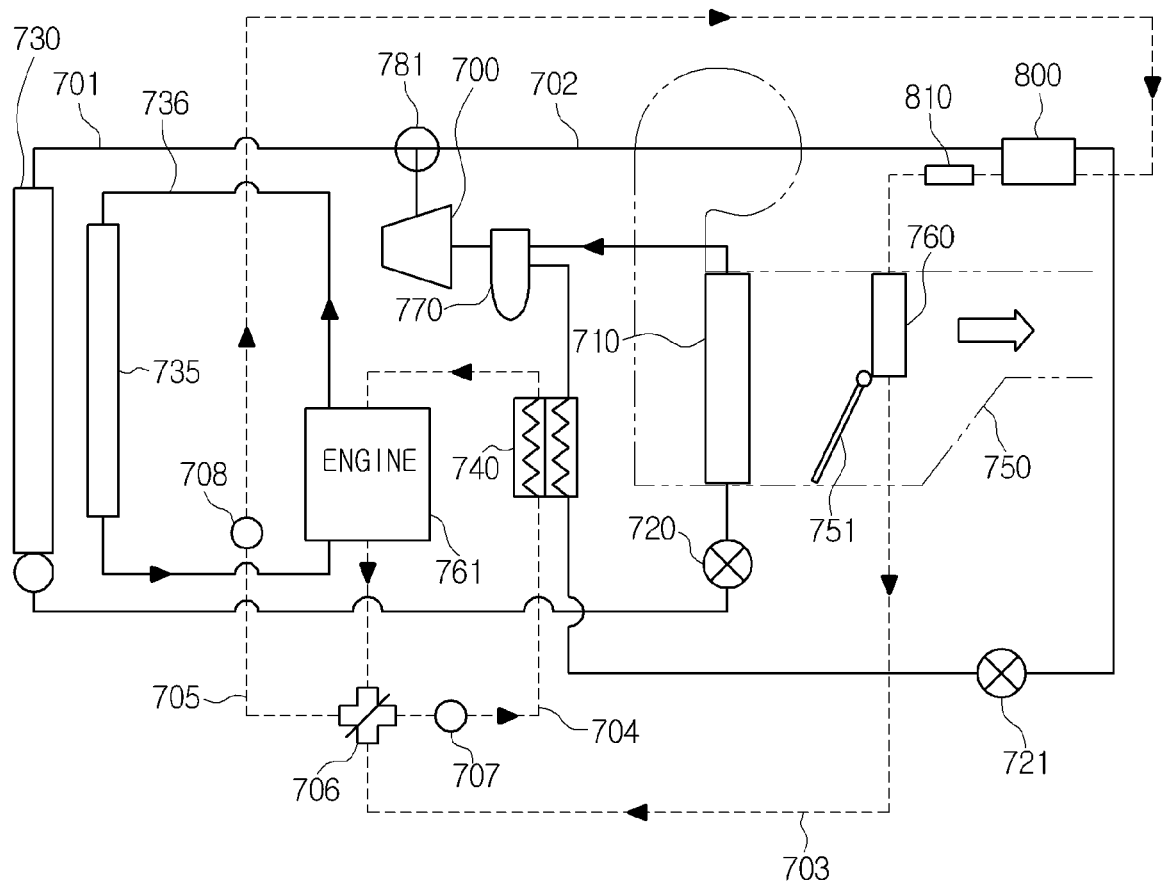
FIG. 6 is a view showing a cooling water mode for heating of the heat pump system for a vehicle according to the first preferred embodiment of the present invention.

FIG. 6 is a view showing a cooling water mode for heating of the heat pump system for a vehicle according to the first preferred embodiment of the present invention.

Referring to FIG. 6, when the cooling water mode for heating is performed due to a relatively high temperature of the cooling water, the compressor 700 is stopped. In this instance, the cooling water passing through the engine 761 passes through the water-cooled condenser 800, the heating means 810 and the heater core 760, passes through the chiller 740 by the four-way valve 706, and then, circulates through the engine 761.

Through the above, structure, when the heat pump system for a vehicle is applied to a hybrid vehicle, the heat pump system can be used with an internal combustion engine in common, and can independently use the waste heat of the engine just as a heat source by separating the heater core which is the heat generation part from the chiller which is the heat absorption part. Additionally, the heat pump system for a vehicle can control the cooling water stably through a PTC heater (heating means).

That is, since the conventional heat pump system for a vehicle uses the waste heat of the engine as heat for heating and as a heat source for a heat pump low temperature part in order to operate the heat pump, temperature of the cooling water is changed rapidly, warm air passing through the evaporator heats the cooling water flowing through the heater core according to temperature of the cooling water. Moreover, since an evaporator for high pressure is required to heat through the evaporator, it requires additional management in manufacturing.

The heat pump system according to the first preferred embodiment of the present invention can effectively use the waste heat of the engine by separating the cooling water loop (first cooling water line) for heating from the cooling water loop (second cooling water line) for a heat pump heat source using the four-way valve. The heat pump system can control temperature of the cooling water stably through the water-cooled condenser and the PTC heater (heating means), and can use an air conditioner in common without additional management since using the evaporator and the heater core of the existing internal combustion engine in common.

Figure 7:
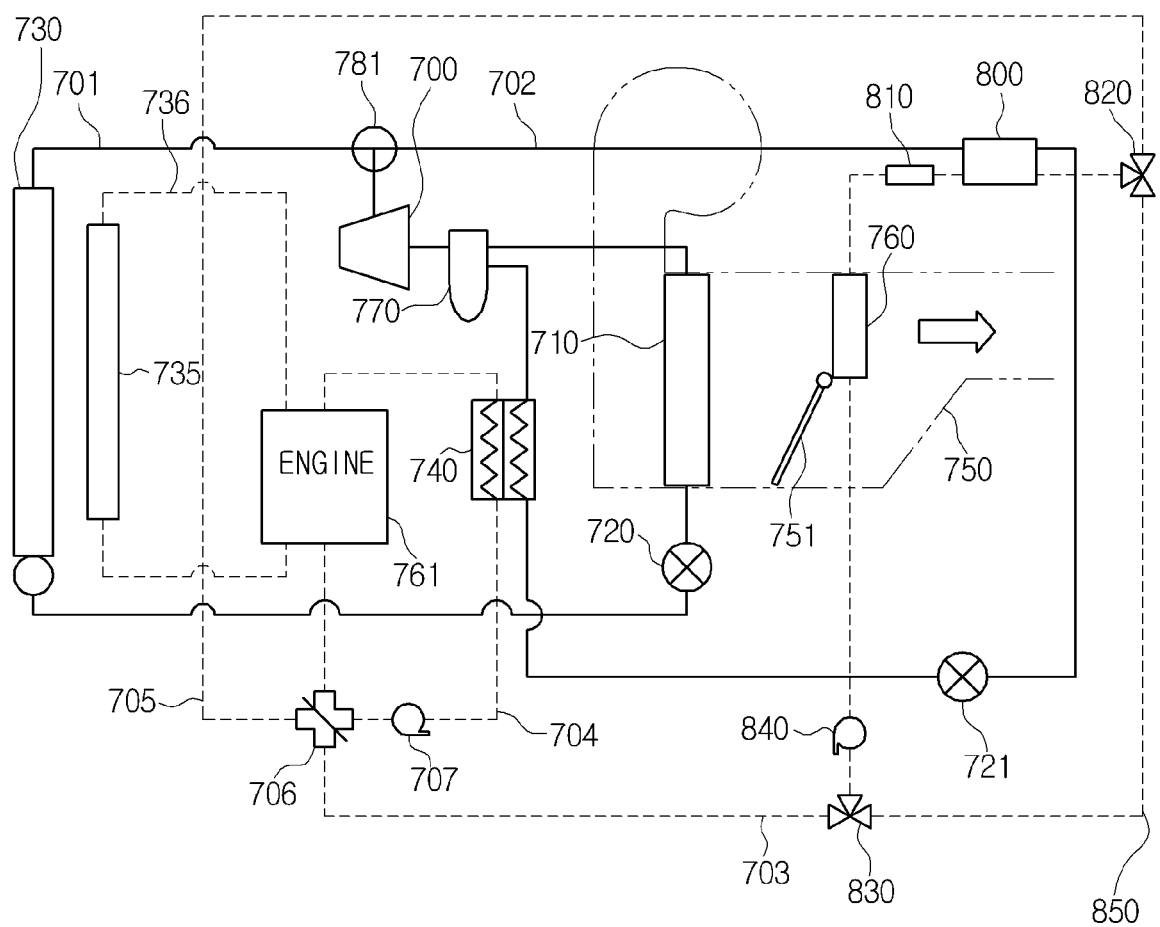
FIG. 7 is a view showing a heat pump system for a vehicle according to a second preferred embodiment of the present invention.
Figure 8:
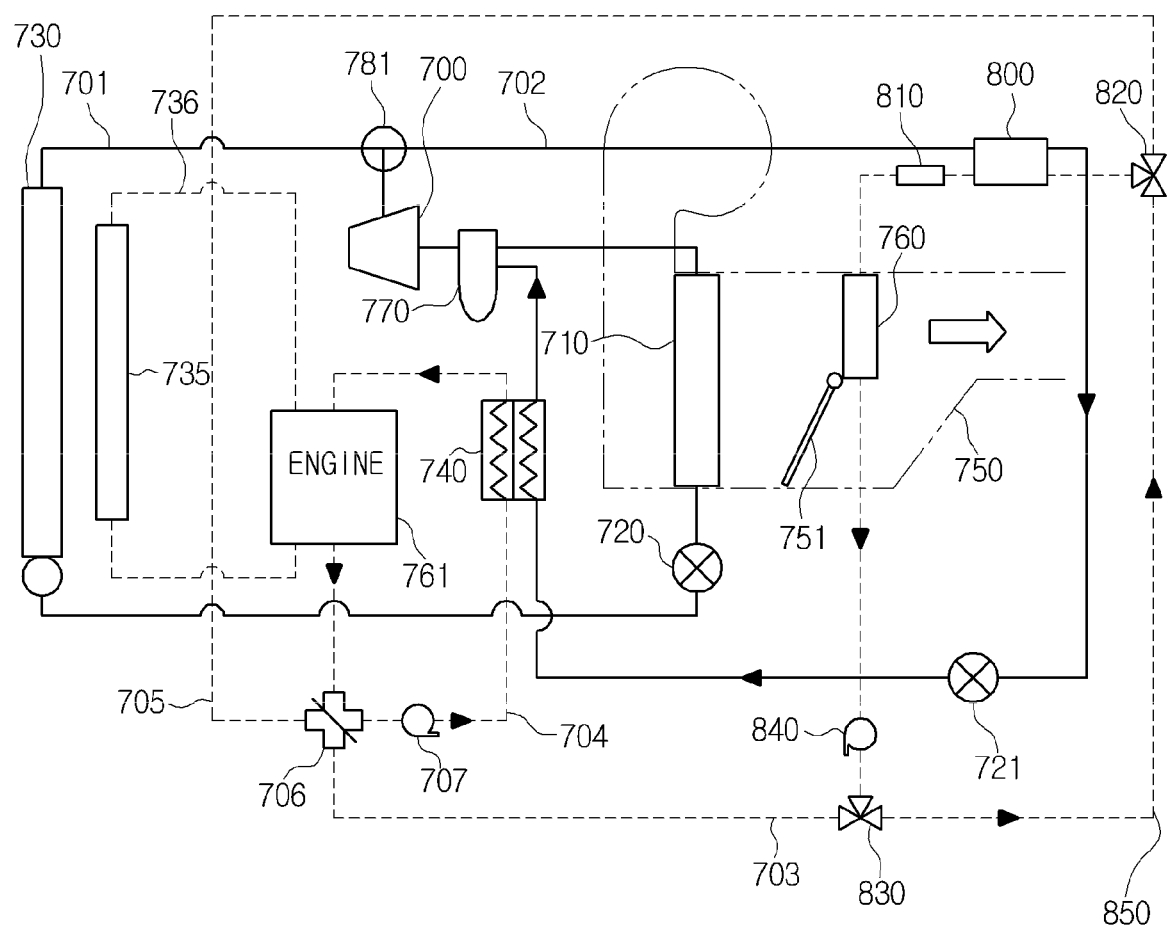
FIG. 8 is a view showing a heat pump mode for heating of the heat pump system for a vehicle according to the second preferred embodiment of the present invention.
Figure 9:
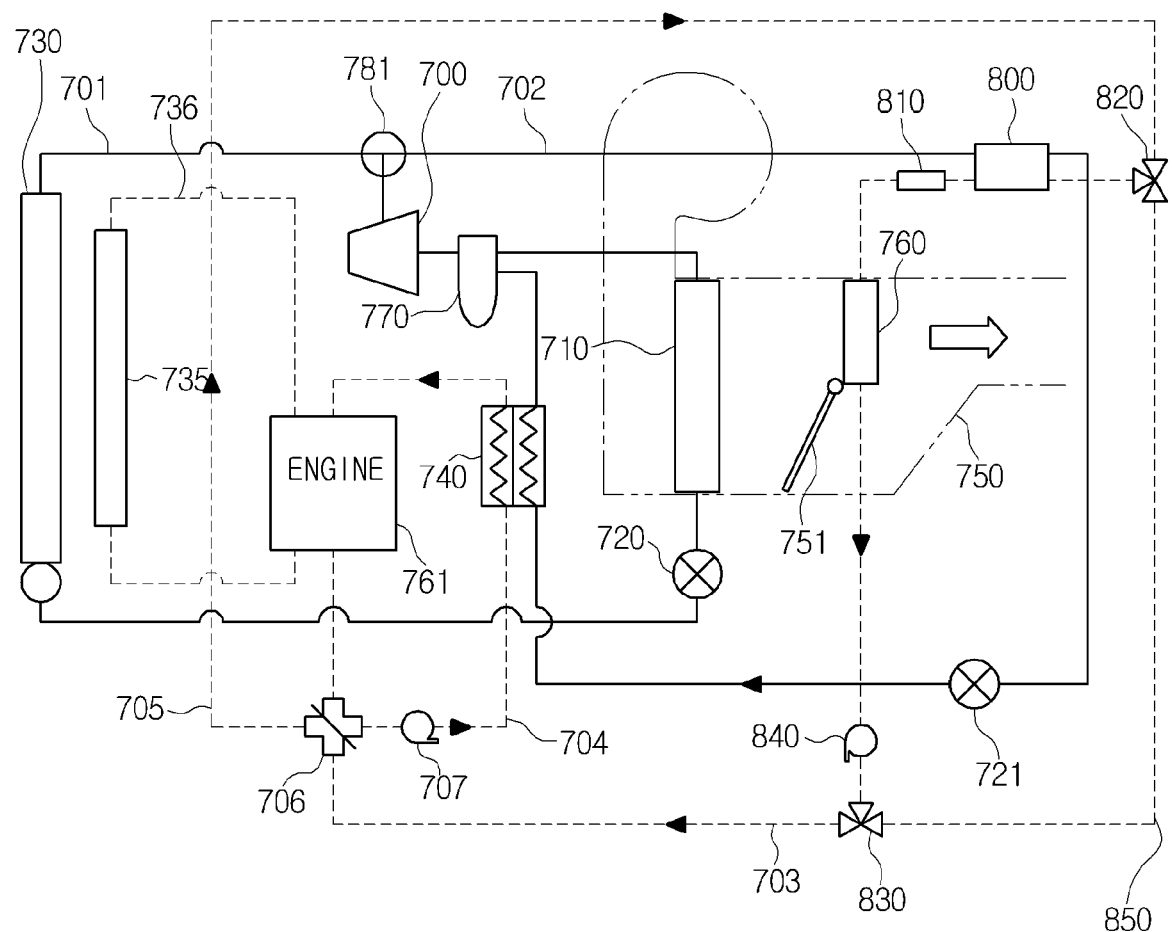
FIG. 9 is a view showing a cooling water mode for heating of the heat pump system for a vehicle according to the second preferred embodiment of the present invention.

In the meantime, FIG. 7 is a view showing a heat pump system for a vehicle according to a second preferred embodiment of the present invention, FIG. 8 is a view showing a heat pump mode for heating of the heat pump system for a vehicle according to the second preferred embodiment of the present invention, and FIG. 9 is a view showing a cooling water mode for heating of the heat pump system for a vehicle according to the second preferred embodiment of the present invention.

Referring to FIGS. 7 to 9, the heat pump system for a vehicle according to the second preferred embodiment of the present invention further includes a third cooling water line 850, a second direction changing valve 820, and a third direction changing valve 830 in comparison with the first preferred embodiment. In this embodiment, description of the same parts as the first preferred embodiment will be omitted.

The third cooling water line 850 branches off from the second cooling water line at the upstream side of the water-cooled condenser 800 and is connected to the second cooling water line at the downstream side of the heater core 760. The second direction changing valve 820 is disposed at a connection point between the second cooling water line and the third cooling water line 850 at the upstream side of the water-cooled condenser 800. The third direction changing valve 830 is disposed at a connection point between the second cooling water line and the third cooling water line 850 at the downstream side of the heater core 760. Preferably, the second direction changing valve 820 and the third direction changing valve 830 are three-way valves. In the first cooling water line 704, a first water pump 707 for circulating the cooling water is disposed, and in the third cooling water line 850, a second water pump 840 for circulating the cooling water is disposed.

If temperature of the cooling water is lower than the reference temperature, the heat pump mode for heating is performed. As shown in FIG. 8, in the heat pump mode, a flow of the refrigerant and a flow of the cooling water in the first cooling water line are the same as the first preferred embodiment. Now, a flow of the second cooling water line will be described. The cooling water passing through the heater core 760 passes through the third cooling water line 850 by the third direction changing valve 830, and circulates through the water-cooled condenser 800 and the heater core 760 by the second direction changing valve 820.

Furthermore, if temperature of the cooling water is higher than the reference temperature, the cooling water mode for heating is performed. As shown in FIG. 9, in the cooling water mode, flows of the refrigerant and the cooling water are the same as the first preferred embodiment. That is, the cooling water passing through the engine 761 passes through the water-cooled condenser 800 and the heater core 760 after bypassing the third cooling water line 850 by the second direction changing valve 820, and then, circulates through the chiller 740 and the engine 761 by the third direction changing valve 830.

As described above, the heat pump system according to the second preferred embodiment has additional loop passing only the water-cooled condenser 800 and the heating means 810 since having two cooling water loops by additionally including the third cooling water line and the two three-way valves, namely, the second direction changing valve and the third direction changing valve. Additionally, additional loop passing only the chiller and the engine is formed.

Through the above structure, when the heat pump system is operated using the cooling water heat source, a high temperature cooling water loop is separated so as to reduce the entire length of the loop. Therefore, the heat pump system can reduce energy losses and increase the quantity of cooling water flowing by the same power, thereby increasing heating performance.

To sum up, in case of the conventional heat pump system having the water-heated condenser, when the heat pump system is operated using the waste heat of the engine, since the high temperature cooling water loop must circulate to the cooling water loop used when engine heat is used, there are lots of energy losses and pressure head is formed high. So, it is difficult to embody a high flow rate. The heat pump system according to the second preferred embodiment of the present invention minimizes energy losses by additionally forming the high temperature cooling water loop passing only the water-cooled condenser, the PTC heater (heating means) and the heater core, and increases the flow rate by reducing pressure head since the cooling water line is formed short.

Figure 10:
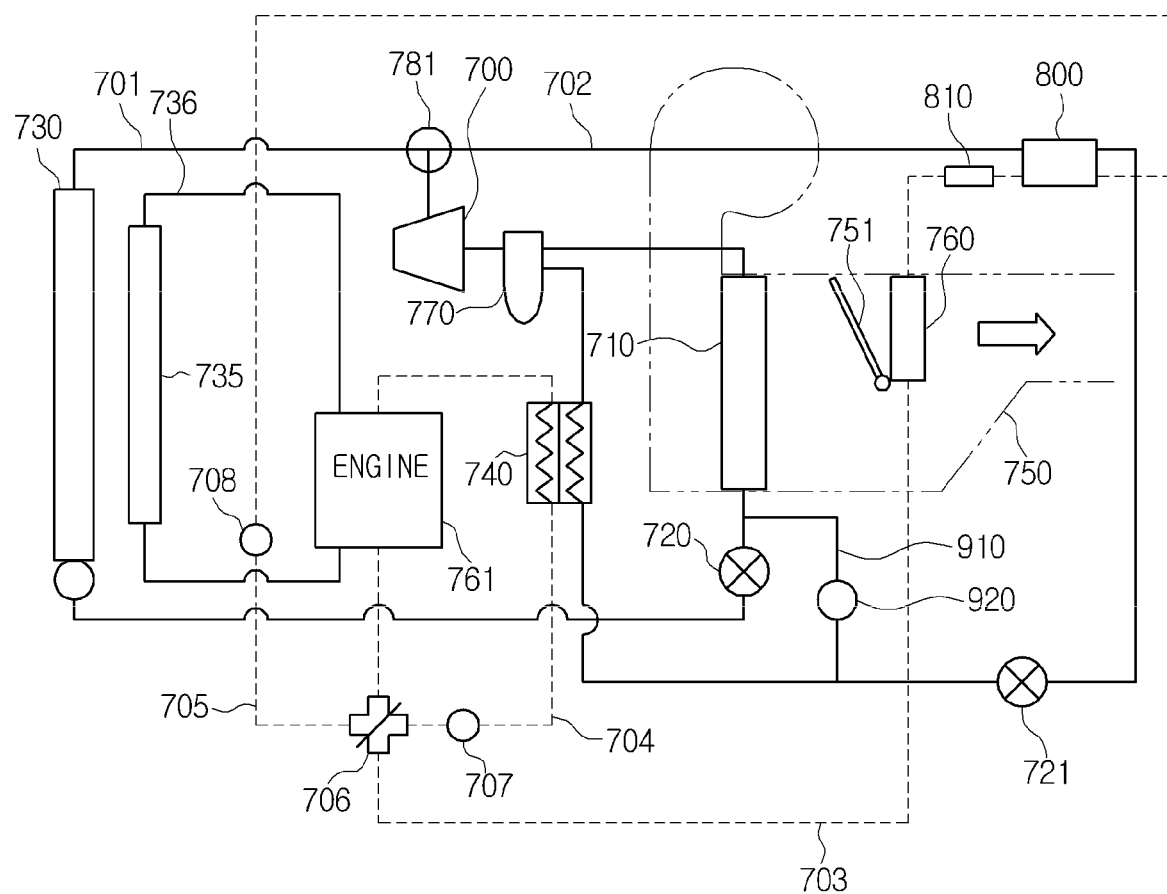
FIG. 10 is a view showing a heat pump system for a vehicle according to a third preferred embodiment of the present invention.

FIG. 10 is a view showing a heat pump system for a vehicle according to a third preferred embodiment of the present invention. The heat pump system according to the third preferred embodiment of the present invention is applied to a hybrid vehicle, and includes a compressor 700, an indoor heat exchanger 710, an outdoor heat exchanger 730, a heater core 760, a first expansion means 720, a chiller 740, a first cooling water line 704, a second cooling water line, a water-cooled condenser 800, a first refrigerant circulation line 701, and a second refrigerant circulation line 702.

The heat pump system according to the third preferred embodiment of the present invention includes an indoor heat exchanger 710, which is the same as the evaporator 710 of the first preferred embodiment, and further includes a refrigerant branching line 910 and a refrigerant flow rate control valve 920. In this embodiment, description of the same parts as the first and second preferred embodiments will be omitted.

The refrigerant branching line 910 branches off from the second refrigerant circulation line 702 at the downstream side of the second expansion means 721, and makes at least some of the refrigerant flowing toward the chiller 740 selectively flow toward the indoor heat exchanger 710.

The refrigerant flow rate control valve 920 selectively controls an amount of the refrigerant flowing toward the refrigerant branching line 910. The refrigerant flow rate control valve 920 may be a two-way valve or a three-way valve, and may be disposed on the refrigerant branching line 910.

The refrigerant branching line 910 connects the refrigerant line between the second expansion means 721 and the compressor 700 with the front end of the indoor heat exchanger 710. In more detail, the refrigerant branching line 910 branches off between the second expansion means 721 and the chiller 740, and is connected to the first refrigerant circulation line 701 between the first expansion means 720 and the indoor heat exchanger 710. The refrigerant flowing in the second refrigerant circulation line 702 after passing the water-cooled condenser 800 flows toward the chiller 740 after passing through the second expansion means 721, and some of the refrigerant does not flow to the chiller 740 by an opening and closing action of the refrigerant flow rate control valve 920, but meets the downstream side of the first expansion means 720 and flows toward the indoor heat exchanger 710.

The refrigerant flowing in the second refrigerant circulation line 702 is expanded into low pressure refrigerant while passing through the second expansion means 721. The refrigerant expanded into low pressure exchanges heat with the air in the air-conditioning case 750 while passing the indoor heat exchanger 710 through the refrigerant branching line 910 to condense moisture in the air on the surface of the indoor heat exchanger 710. Therefore, the air-conditioning air discharged to the interior of the vehicle provides dehumidification effect.

The refrigerant expanded into low pressure while passing the second expansion means 721 flows toward the chiller 740. In this instance, the refrigerant flow rate control valve 920 is disposed in the refrigerant branching line 910, so that the refrigerant always flows toward the chiller 740 and only some of the refrigerant flowing toward the chiller 740 flows toward the indoor heat exchanger 710 through the refrigerant branching line 910.

That is, the refrigerant passing the second expansion means 721 surely flows toward the chiller 740, but does not necessarily flow toward the indoor heat exchanger 710 through the refrigerant branching line 910. The refrigerant flow rate control valve 920 is completely closed so as to control all of the refrigerant to flow only toward the chiller 740 if the heat pump system is not in the dehumidification mode.

Figure 11:
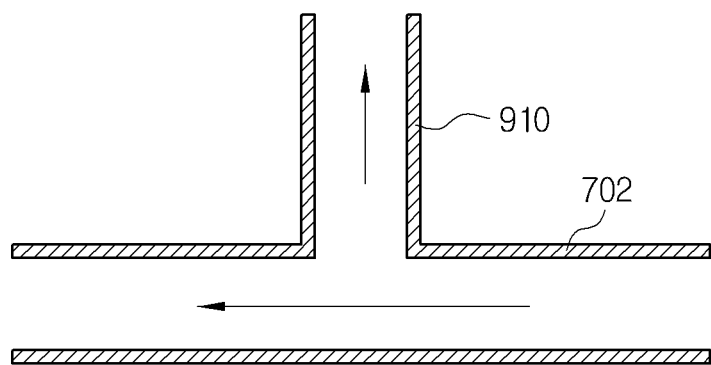
FIG. 11 is an enlarged sectional view showing a refrigerant branching line of the heat pump system for a vehicle according to the third preferred embodiment of the present invention.

FIG. 11 is an enlarged sectional view showing a refrigerant branching line of the heat pump system for a vehicle according to the third preferred embodiment of the present invention. Referring to FIG. 11, the refrigerant branching line 910 is connected in the upward direction from the second refrigerant circulation line 702. In this instance, the upward direction is a height direction. Therefore, if the heat pump system is not in the dehumidification mode, oil trap to a dehumidification line can be prevented.

Figure 12:
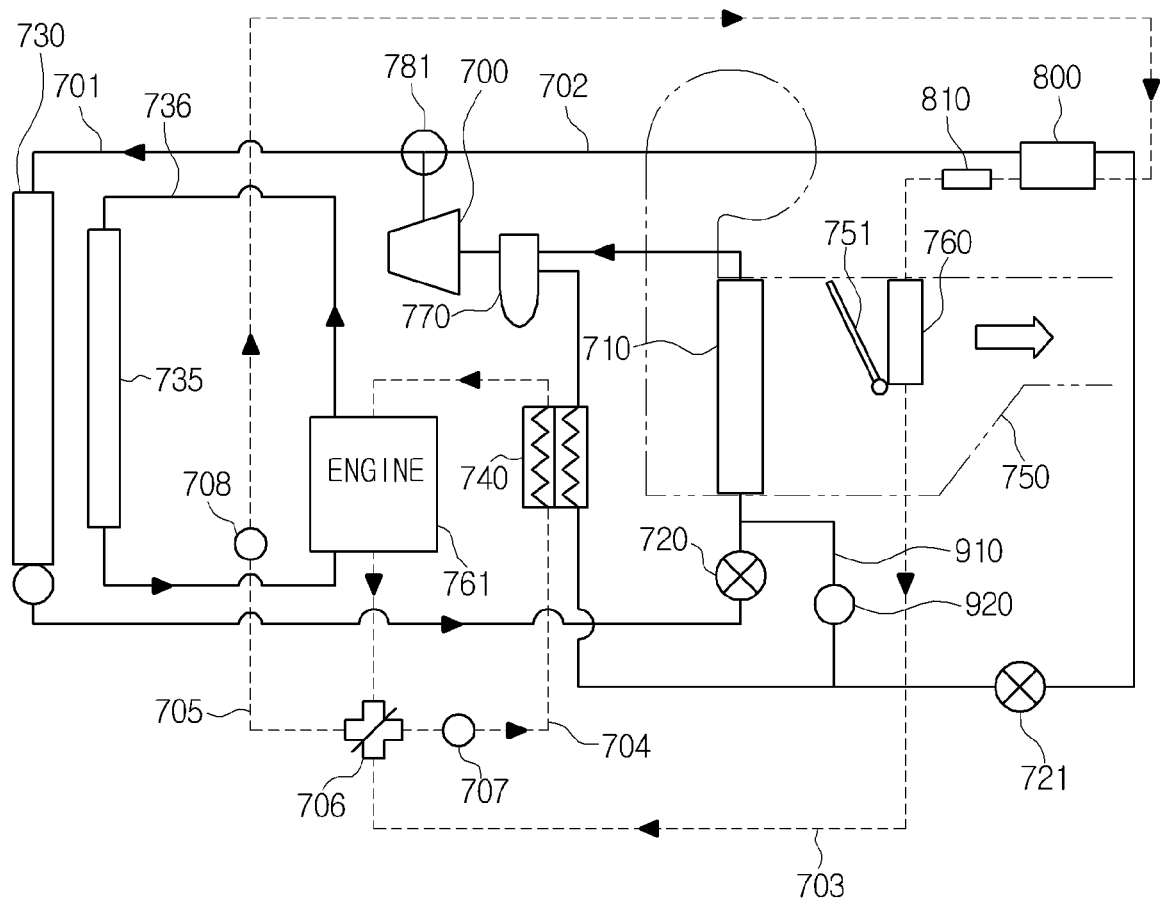
FIG. 12 is a view showing a cooling mode for heating of the heat pump system for a vehicle according to the third preferred embodiment of the present invention.

FIG. 12 is a view showing a cooling mode for heating of the heat pump system for a vehicle according to the third preferred embodiment of the present invention.

Referring to FIG. 12, in the cooling mode, the refrigerant circulates along the first refrigerant circulation line 701 by control of the direction changing valve 781. In the maximum cooling mode, the temperature adjusting door 751 in the air-conditioning case 750 is operated to close the passageway passing through the heater core 760, so that the air blown into the air-conditioning case 750 by the blower is cooled while passing through the indoor heat exchanger 710, bypasses the heater core 760, and is supplied to the interior of the vehicle to cool the interior of the vehicle.

The gas-phase refrigerant of high temperature and high pressure discharged after being compressed in the compressor 700 is supplied to the outdoor heat exchanger 730 through the direction changing valve 781. The refrigerant supplied to the outdoor heat exchanger 730 is condensed by exchanging heat with the outdoor air, and is changed into liquid-phase refrigerant. Continuously, the refrigerant passing through the outdoor heat exchanger 730 is decompressed and expanded while passing through the first expansion means 720 to become liquid-phase refrigerant of low temperature and low pressure, and then, is introduced into the indoor heat exchanger 710.

The refrigerant introduced into the indoor heat exchanger 710 is evaporated by exchanging heat with the air blown into the air-conditioning case 750 by the blower, and at the same time, cools the air through a heat absorption by an evaporative latent heat of the refrigerant, and then, the cooled air is supplied to the interior of the vehicle to cool the interior. After that, the refrigerant discharged from the evaporator 710 is introduced into the compressor 700 through the accumulator 770, and repeats the above cycle.

In this instance, the cooling water passing through the engine 761 passes through the water-cooled condenser 800, the heating means 810, and the heater core 760, and then, circulates through the engine 761 after passing through the chiller 740 by the four-way valve 706.

Figure 13:
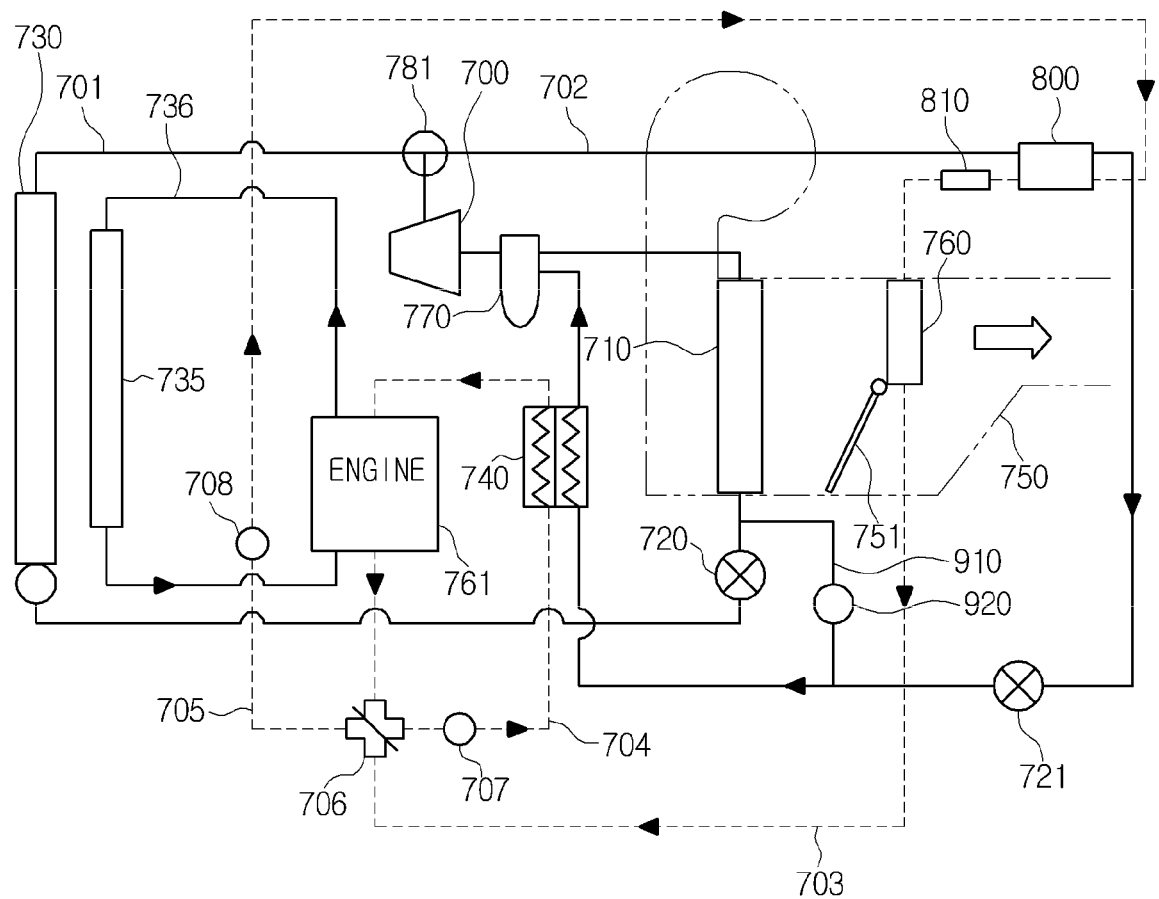
FIG. 13 is a view showing a heat pump mode for heating of the heat pump system for a vehicle according to the third preferred embodiment of the present invention.

FIG. 13 is a view showing a heat pump mode for heating of the heat pump system for a vehicle according to the third preferred embodiment of the present invention.

Referring to FIG. 13, when the heat pump mode for heating is performed due to a relatively low temperature of the cooling water, the refrigerant is circulated along the second refrigerant circulation line 702 by control of the first direction changing valve 781. In the maximum heating mode, the temperature adjusting door 751 in the air-conditioning case 750 is operated to close the passageway bypassing the heater core 760, so that the air blown into the air-conditioning case 750 by the blower is changed into warm air while passing the heater core 760, and then, is supplied to the interior of the vehicle to heat the interior of the vehicle.

The gas-phase refrigerant of high temperature and high pressure discharged after being compressed in the compressor 700 heats the cooling water passing through the water-cooled condenser 800 while passing through the water-cooled condenser 800 through the first direction changing valve 781. The refrigerant condensed in the water-cooled condenser 800 is expanded while passing through the second expansion means 721, recovers waste heat of the engine while passing the chiller 740, and then, is circulated to the compressor 700.

In this instance, the cooling water heated in the water-cooled condenser 800 performs indoor heating by exchanging heat with the air after passing through the heater core 760. That is, the cooling water passing through the water-cooled condenser 800 bypasses the chiller 740 and the engine 761 by the four-way valve 706 after passing through the heater core 760 along the second cooling water line 703 and 705, and then, is circulated to the water-cooled condenser 800. In the meantime, the cooling water flowing in the first cooling water line 704 circulates through the engine 761, the chiller 740, and the engine 761. The heater core 760 of the second cooling water line acts as a heat generation part, and the chiller 740 of the first cooling water line acts as a heat absorption part.

Figure 14:
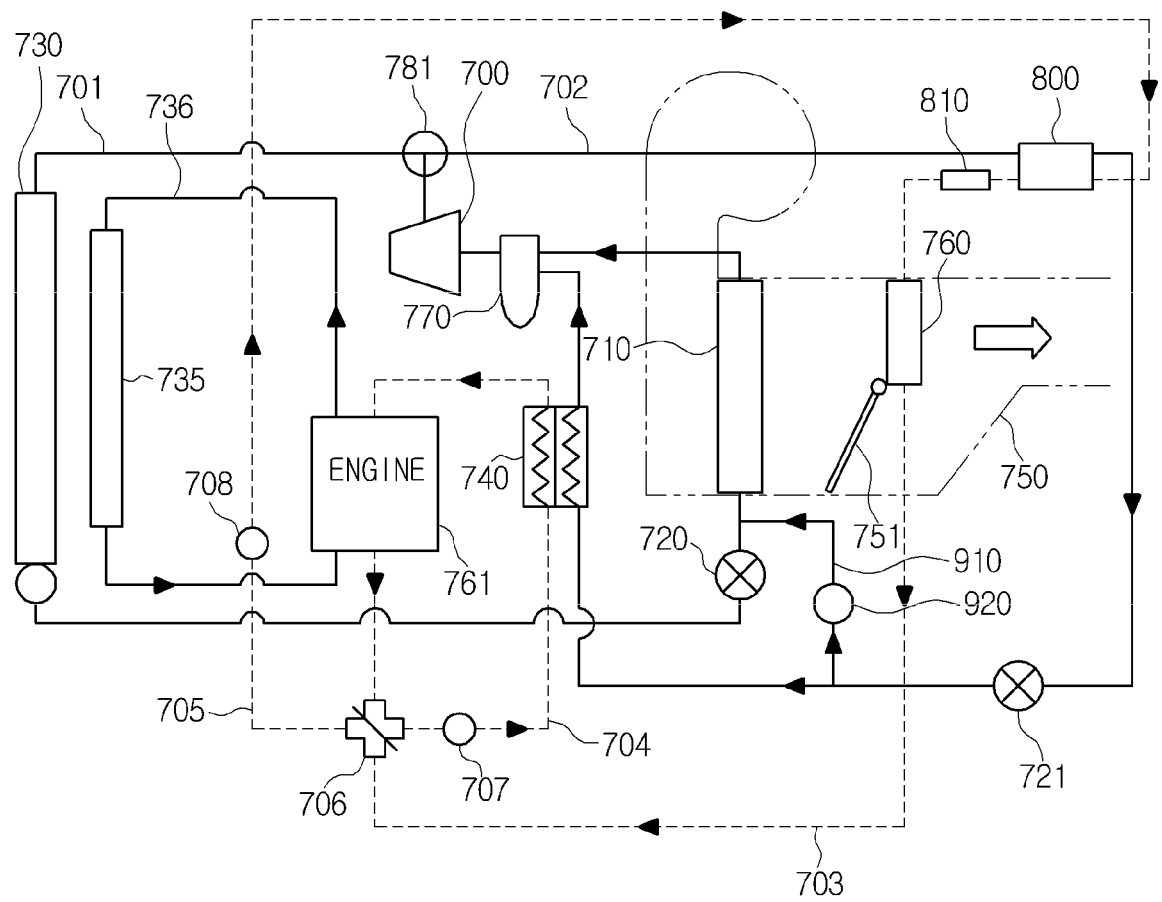
FIG. 14 is a view showing the heat pump mode for heating and a dehumidification mode of the heat pump system for a vehicle according to the third preferred embodiment of the present invention.

FIG. 14 is a view showing the heat pump mode for heating and a dehumidification mode of the heat pump system for a vehicle according to the third preferred embodiment of the present invention.

Referring to FIG. 14, the refrigerant circulates along the second refrigerant circulation line 702 by control of the direction changing valve 781. In the maximum heating mode, the temperature adjusting door 751 in the air-conditioning case 750 is operated to close the passageway bypassing the heater core 760, so that the air blown into the air-conditioning case 750 by the blower is changed into warm air while passing the heater core 760, and then, is supplied to the interior of the vehicle to heat the interior of the vehicle.

The gas-phase refrigerant of high temperature and high pressure discharged after being compressed in the compressor 700 heats the cooling water passing through the water-cooled condenser 800 while passing through the water-cooled condenser 800 through the first direction changing valve 781. The refrigerant condensed in the water-cooled condenser 800 is expanded while passing through the second expansion means 721, recovers waste heat of the engine while passing the chiller 740, and then, is circulated to the compressor 700.

In this instance, some of the refrigerant flowing toward the chiller 740 selectively flows into the refrigerant branching line 910 by operation of the refrigerant flow rate control valve 920, meets the first refrigerant circulation line 701 between the first expansion means 720 and the indoor heat exchanger 710, and then, flows toward the indoor heat exchanger 710. The refrigerant expanded into low pressure exchanges heat with the air in the air-conditioning case 750 while passing through the indoor heat exchanger 710 to condense moisture in the air on the surface of the indoor heat exchanger 710 to perform dehumidification.

The heat pump system for a vehicle according to the third preferred embodiment of the present invention performs a heating action by heating the cooling water through the water-cooled condenser, and at the same time, performs a dehumidification action by making the refrigerant of low temperature and low pressure flow toward the indoor heat exchanger. Therefore, the heat pump system for a vehicle according to the present invention can reduce air-conditioning power consumption by dividing the refrigerant of a low pressure part toward the chiller and the indoor heat exchanger without operation of a high voltage PTC and a cooling cycle (operation of the compressor) even during the heating mode.

Furthermore, the refrigerant branching line branches off above the second refrigerant circulation line, which is the heating line, so that a refrigerant branching direction is always formed at an upper part, thereby preventing oil circulating in the refrigerant line from being gathered in the branching line.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims.

The invention claimed is:

1. A heat pump system for a vehicle comprising:
   a first cooling water line for circulating cooling water by connecting a vehicle driving part and a chiller with each other;
   a second cooling water line disposed in an air-conditioning case for circulating cooling water by connecting a heater core used for heating the interior of the vehicle and a water-cooled condenser with each other; and
   a valve disposed between the first cooling water line and the second cooling water line,
   wherein the first cooling water line and the second cooling water line are operated independently if the valve is arranged in a first manner, and
   wherein the first cooling water line and the second cooling water line are in a serial connection if the valve is arranged in a second manner.

2. The heat pump system according to claim 1, wherein a refrigerant line including a compressor, an outdoor heat exchanger, a first expansion means and an evaporator in order to air-condition the interior of the vehicle is formed, and
   wherein the chiller of the first cooling water line and the water-cooled condenser of the second cooling water line exchange heat with the refrigerant line.

3. The heat pump system according to claim 2, wherein the chiller exchanges heat with refrigerant before being introduced into the compressor in a heat pump mode for heating.

4. The heat pump system according to claim 2, wherein the water-cooled condenser exchanges heat with the refrigerant discharged from the compressor.

5. The heat pump system according to claim 1, wherein the water-cooled condenser is disposed in the second cooling water line of an upstream side of the heater core in a flow direction of the cooling water, and exchanges heat between the refrigerant discharged from the compressor and the cooling water flowing in the second cooling water line, and
   wherein the water-cooled condenser comprises a second refrigerant circulation line, which connects a refrigerant line in such a way that the refrigerant discharged from the compressor circulates through the water-cooled condenser, the chiller, and the compressor in a heat pump mode for heating.

6. The heat pump system according to claim 1, wherein the valve equipped between the first cooling water line and the second cooling water line comprises a four-way valve, and the cooling water passing through the heater core passes through or bypasses the chiller and an engine according to operation of the four-way valve.

7. The heat pump system according to claim 5, wherein in the second refrigerant circulation line, a second expansion means is disposed between the water-cooled condenser and the chiller.

8. The heat pump system according to claim 1, wherein in a cooling water mode for heating, the compressor is stopped, and the second cooling water line is connected to the first cooling water line so that the cooling water circulates through the water-cooled condenser, the heater core, the chiller, and the engine.

9. The heat pump system according to claim 8, wherein in a heat pump mode for heating, the refrigerant discharged from the compressor circulates through the water-cooled condenser, the chiller, and the compressor, and the second cooling water line bypasses the first cooling water line so that the cooling water in the second cooling water line circulates through the water-cooled condenser and the heater core, and wherein the cooling water of the first cooling water line independently circulates through the engine and the chiller with respect to the second cooling water line.

10. The heat pump system according to claim 9,
    wherein the heat pump mode for heating is performed if the sensed temperature of the cooling water is lower than a reference temperature, and the cooling water mode for heating is performed if the sensed temperature of the cooling water is higher than the reference temperature.

11. The heat pump system according to claim 1, further comprising:
    a heating device disposed in the second cooling water line to heat the cooling water.

12. The heat pump system according to claim 1, wherein a first water pump for circulating the cooling water is disposed in the first cooling water line, and a second water pump for circulating the cooling water is disposed in the second cooling water line.

13. The heat pump system according to claim 5, further comprising:
    a first direction changing valve disposed at a point where the first and second refrigerant circulation lines diverge from an outlet side of the compressor, wherein the first direction changing valve changes the flow direction of the refrigerant so that the refrigerant discharged from the compressor flows toward the first refrigerant circulation line or the second refrigerant circulation line according to the cooling mode or the heating mode.

14. The heat pump system according to claim 1, further comprising:
    a third cooling water line, which branches off from the second cooling water line at the upstream side of the water-cooled condenser and is connected to the second cooling water line at the downstream side of the heater core.

15. The heat pump system according to claim 14, further comprising:
    a second direction changing valve disposed at a connection point between the second cooling water line and the third cooling water line at the upstream side of the water-cooled condenser; and
    a third direction changing valve disposed at a connection point between the second cooling water line and the third cooling water line at the downstream side of the heater core.

16. The heat pump system according to claim 15, wherein if the cooling water passing through the heater core passes through the third cooling water line by the third direction changing valve, and circulates through the water-cooled condenser and the heater core by the second direction changing valve.

17. The heat pump system according to claim 15, wherein the cooling water passing through the engine passes through the water-cooled condenser and the heater core after bypassing the third cooling water line by the second direction changing valve, and then, circulates through the chiller and the engine by the third direction changing valve.

18. The heat pump system according to claim 1, further comprising:
- a compressor for compressing and discharging refrigerant;
- an indoor heat exchanger disposed in the air-conditioning case to exchange heat between air and the refrigerant;
- an outdoor heat exchanger mounted outside the air-conditioning case to exchange heat between outdoor air and the refrigerant;
- a first expansion means disposed between the indoor heat exchanger and the outdoor heat exchanger to expand the refrigerant;
- a first refrigerant circulation line, which connects a refrigerant line so that the refrigerant discharged from the compressor circulates through the outdoor heat exchanger, the first expansion means, the indoor heat exchanger, and the compressor; and
- a second refrigerant circulation line, which connects the refrigerant line so that the refrigerant discharged from the compressor circulates through the water-cooled condenser, the chiller, and the compressor,
- wherein some of the refrigerant of the second refrigerant circulation line branches off to the first refrigerant circulation line.

19. The heat pump system according to claim 18, further comprising:
- a second expansion means disposed in the second refrigerant circulation line between the water-cooled condenser and the chiller to expand the refrigerant; and
- a refrigerant branching line branching off from the second refrigerant circulation line at the downstream side of the second expansion means, and making at least some of the refrigerant flowing toward the chiller selectively flow toward the indoor heat exchanger.

20. The heat pump system according to claim 19, wherein the refrigerant branching line connects the refrigerant line between the second expansion means and the compressor to the indoor heat exchanger.

21. The heat pump system according to claim 19, wherein the refrigerant branching line branches off between the second expansion means and the chiller, and is connected to the first refrigerant circulation line between the first expansion means and the indoor heat exchanger.

22. The heat pump system according to claim 19, wherein the refrigerant branching line is connected in a direction from the second refrigerant circulation line.

23. The heat pump system according to claim 19, wherein in a dehumidification mode, some of the refrigerant, which is discharged from the compressor and flows to the chiller after passing through the water-cooled condenser and the second expansion means, selectively flows to the refrigerant branching line and passes through the indoor heat exchanger.

* * * * *